United States Patent [19]
Fahrbach et al.

[11] 3,933,943
[45] Jan. 20, 1976

[54] GRAFT COPOLYMERS BASED ON METHYL METHACRYLATE POLYMERS

[75] Inventors: Gerhard Fahrbach, Schwetzingen; Erhard Seiler, Ludwigshafen; Dieter Stein, Limburgerhof, all of Germany

[73] Assignee: BASF Aktiengesellschaft, Ludwigshafen (Rhine), Germany

[22] Filed: Oct. 24, 1973

[21] Appl. No.: 409,257

[30] Foreign Application Priority Data
Oct. 26, 1972 Germany............................ 2252508

[52] U.S. Cl. ............ 260/887; 260/94.7·A; 260/892; 260/901
[51] Int. Cl.². ........................................... C08L 9/06
[58] Field of Search ...... 260/874, 887, 901, 94.7 A, 260/892

[56] References Cited
UNITED STATES PATENTS

| | | | |
|---|---|---|---|
| 3,050,511 | 8/1962 | Szwarc | 260/874 |
| 3,175,997 | 3/1965 | Hsieh | 260/94.7 A |
| 3,418,354 | 12/1968 | Wheeler, Jr. | 260/901 |
| 3,499,059 | 3/1970 | Molau et al. | 260/876 R |
| 3,626,027 | 12/1971 | Tanaku | 260/901 |
| 3,786,116 | 1/1974 | Milkovich et al. | 260/884 |

*Primary Examiner*—Murray Tillman
*Assistant Examiner*—J. Ziegler
*Attorney, Agent, or Firm*—Johnston, Keil, Thompson & Shurtleff

[57] ABSTRACT

This invention relates to a process for the manufacture of graft copolymers based on methyl methacrylate polymers. The methyl methacrylate polymer is reacted with a high molecular weight organic compound containing at least one alkylene oxide unit having an alkali metal alcoholate end group, during which reaction transesterification occurs to eliminate alkali metal methoxide and cause chain joining. The graft copolymers may be used for the production of shaped articles or coating compositions and as additives, antistatic agents or adhesion promoters for plastics materials.

4 Claims, No Drawings

GRAFT COPOLYMERS BASED ON METHYL METHACRYLATE POLYMERS

Polymers containing methyl methacrylate units and polyalkylene oxide groups are transparent, tough plastics materials. They may be prepared, for example, by the method described in German Published Application No. 2,023,303 involving copolymerization of methyl methacrylate with unsaturated esters of polyalkylene oxides. This method, however, requires prior manufacture and purification of the esters, this being a very complicated operation.

It is an object of the invention to provide a simple process for the manufacture of said polymers.

It is further object of the invention to manufacture polymers in which diolefin polymers are combined with methyl methacrylate polymers in order to combine the high elasticity of the polydiolefin with the good optical properties of polymethyl methacrylate. Such polymers can be manufactured only at very poor yields if attempts are made to effect direct grafting of anionically polymerized polybutadiene to the living chain end of the polymethyl methacrylate. Free-radical grafting of methyl methacrylate onto polybutadiene gives non-transparent products.

We have now found that graft copolymers based on methyl methacrylate polymers may be manufactured in a simple manner by reacting a polymer of methyl methacrylate (A) containing at least 10% by weight of polymerized units of methyl methacrylate with a high molecular weight organic compound (B) containing at least one alkylene oxide unit having an alkali metal alcoholate end group and also optionally containing polymer blocks of diolefin and/or vinyl aromatic units, said reaction being carried out in an anhydrous inert organic solvent.

The component A is a methyl methacrylate polymer containing at least 10% and preferably more than 25% by weight of polymerized units of methyl methacrylate. It may contain usual comonomers such as acrylates or methacrylates of alcohols having from 1 to 8 carbon atoms in the alkyl radical, acrylonitrile and methacrylonitrile, and also styrene or diene monomers. In the reaction of the invention, the methyl methacrylate polymer is used as a solution in an anhydrous inert solvent. This solution may be prepared, for example, by dissolving polymethyl methacrylate in toluene or tetrahydrofuran. The traces of water contained in the polymethyl methacrylate must be removed thoroughly. Alternatively, the methyl methacrylate polymer may be manufactured by solution polymerization, in which case the resulting solution will be used directly. This polymerization may be initiated ionically or with free radicals. In the case of ionic polymerization, initiators which are suitable include lithium alkyl such butyl lithium or addition complexes of alkali metals such as cumyl potassium, naphthalene potassium and tetrameric α-methylstyrene dipotassium. Suitable free-radical initiators are the usual peroxides and azo compounds. Suitable solvents in both cases are hydrocarbons such as benzene, toluene and ethyl benzene, whilst in the case of ionic polymerizations use may also be made of ethers such as diethyl ether, dioxane and tetrahydrofuran.

Component B is a high molecular weight organic compound containing at least one alkylene oxide unit having an alkali metal alcoholate end group and also optionally containing polymer blocks of diolefin and/or vinyl aromatic units.

In the simplest case it is a polyalkylene oxide, preferably polyethylene oxide or polypropylene. In this case it should have a degree of polymerization of at least approximately 100. It is prepared in known manner by polymerization of ethylene oxide of propylene oxide in, preferably, polar solvents with addition complexes of sodium or potassium with for example α-methylstyrene, naphthalene, diphenyl, stilbene or other fused ring systems. These initiators have a difunctional action and give polymers having two living chain ends. Initiators having a monofunctional action are for example cumyl potassium, phenyl potassium and benzyl potassium. The initiators are generally used in amounts of from 0.001 to .5% by weight. Particularly suitable solvents are ethers. Alternatively, polymerization may - particularly where initiators having a monofunctional action are used - be carried out in non-polar hydrocarbon solvents. The polymerization temperature is generally between −120° and +70°C.

Component B may also consist of block copolymers of polyalkylene oxide as one block with diolefin and/or vinyl aromatic polymers as the other block. Such block copolymers may be prepared for example as described in U.S. Patent 3,050,511 or German Patent Application No. P 2,230,277 (now German Laid-Open Application No. 2,230,277) filed May 13, 1970 by polymerizing butadiene or styrene either alone or together, or one after the other, using the said alkali metal addition complexes as initiators, whereupon ethylene oxide is added to the living chain end. Where butadiene is used, there are produced polybutadiene blocks having a relatively high content of 1,2-vinyl double bonds.

If organolithium compounds are used in the manufacture of the diolefin polymers or vinyl aromatic polymers, no block copolymers are formed in the reaction with ethylene oxide, as the growth rate of the ethylene oxide polymerization is very low in this case. Thus an alcoholate group tends to be formed at the chain end due to addition of one ethylene oxide unit. Consequently, this method also falls within the scope of the present invention. Where butadiene is used, there are formed polybutadiene blocks having a high content of 1,4 double bonds, provided polymerization is not carried out in polar solvents.

Depending on whether monofunctional or difunctional initiators are used in the manufacture of such block copolymers, the resulting polymers have one or two living chain ends. In all cases the resulting polymers are high molecular weight organic compounds containing one or two alkali metal alcoholate end groups. In the reaction of component A with component B according to the present invention, this end group reacts with an ester group of the methyl methacrylate polymer to cause transesterification and elimination of alkali metal methoxide and to cause joining of the two polymer chains. This transesterification is an equilibrium reaction which, due to the excess of ester groups, is shifted well over to the grafting side. This reaction is carried out by mixing the solutions containing components A and B, preferably at temperatures of between −50° and +100°C. The reaction may take place in a variety of ways:

If component B has only one alkali metal alcoholate end group, i.e. if it was prepared using initiators having a monofunctional action, then pure graft polymers are formed. These are britttle but, due to the freely mobile polyalkylene oxide chain, they are water-soluble.

If, however, the component B contains two alkali metal alcoholate end groups, i.e. if it has been prepared using initiators having a difunctional action, it can react with the methyl methacrylate polymer A at both ends, in which case complete grafting leads to crosslinking. The resulting products are tough and water-insoluble.

The degree of grafting may be varied by allowing the attack of of the living alkali metal alcoholate groups to take place on more than one ester group of the methyl methacrylate polymer. This will particularly be the case when the number of chains of component B in the reaction is greater than that of the chains of component A. In this way it is possible to product graft polymers in which a number of side chains B are grafted to a main chain A.

If, as explained above, organolithium compounds are used as initiators in the manufacture of the butadiene polymers, graft copolymers can be prepared which consist of A. a main chain containing more than 25% and preferably more than 50% of polymerized units of methyl methacrylate and B. at least one and preferably from two to twenty side chains per main chain, which side chains contain more than 25% and preferably more than 50% of polymerized units of butadiene and having 1,4 configuration to the extent of from 75 to 95%.

In this case, if initiators having a difunctional action are used, there are obtained wholly or partially crosslinked graft copolymers in which some of the side chains form bridging chains between two main chains.

Following the reaction of the components, it is convenient to first stop the living chain ends by adding proton-active substances such as organic acids, e.g. acetic acid. The graft copolymers may then be precipitated from the solution with petroleum ether, where the alkylene oxide content is high, or with alcohol or water, where the alkylene oxide content is low. The graft copolymer is then isolated by filtration or by evaporation of the solvent.

The polymer chain A has a hydrophobic character, whilst the polyalkylene oxide blocks B are generally hydrophilic. By varying the ratio of components A to B, it is possible to adjust the combination of hydrophilic and hydrophobic properties in a desired manner. This forms the basis of a number of applications.

The graft copolymers of the invention may be used for the production of shaped articles or coating compositions. They are usually transparent and, when initiators having a difunctional action are used, they are also tough. They may be used as additives to a number of plastics materials. When monomeric organic compounds are polymerized in the presence of graft copolymers containing diene polymers, grafting may occur at the double bonds. In such polymer mixtures or graft polymers, the hydrophilic polyalkylene oxide blocks suppress static electrification. This fact may be utilized for example when rendering styrene or methyl methacrylate polymers antistatic and impact-resistant, in which case the antistatic agent will be present as an integral part of the polymer and thus will not be able to migrate or be dissolved out. Particularly advantageous is the low glass temperature of the diene polymer blocks having a high 1,4 content, since such block copolymers are rubber-elastic over a wide temperature range.

Due to their high water absorption properties, the graft copolymers are suitable for use as coating materials on non-woven webs of fibrous material. They may also be used as adhesion promoters for bonding purposes, for example for bonding polystyrene and polymethyl methacrylate, or as compatibility promoters when blending various plastics. The combination of hydrophilic and hydrophobic properties makes the water-soluble graft copolymers suitable for use as surfactants, protective colloids or emulsifiers.

EXAMPLE 1

Grafting of monofunctionally living polyethylene oxide on polymethyl methacrylate A. 1,500 ml of tetrahydrofuran (distilled over α-methylstyrene dipotassium) and 226 g of methyl methacrylate (distilled over calcium hydride) are placed in a vessel. This solution is mixed, at −40°C, with 40 ml of a 0.5M solution of α-methyl-styrene dipotassium in tetrahydrofuran. Polymerization is complete after 1 hour and the molecular weight of the product is found to be 37,000 by measuring the viscosity.

B. 1,500 ml of tetrahydrofuran and 25 ml of cumyl potassium (as 0.5M suspension in cumene) are placed in a separate reaction vessel. 220 g of ethylene oxide (distilled over lithium butyl) are added at 0°C and polymerization is then effected for 4 hours at 40°C. There is obtained 100% conversion and the molecular weight of the product is 9,500.

C. The contents of the two vessels are mixed together. It is found that the molecular weight of the polymethyl methacrylate is approximately doubled after only 25 minutes at room temperature. The addition of methanol causes no further precipitation of polymethyl methacrylate. The grafting yield is substantially 100%. The graft copolymer is soluble in methanol and water and panels compression molded therefrom are transparent and brittle.

EXAMPLE 2

Grafting of difunctionally living polyethylene oxide on anionically polymerized polymethyl methacrylate A. 1,500 ml of tetrahydrofuran and 320 g of methyl methacrylate are placed in a vessel and polymerization is effected at −40°C by the addition of 30 ml of a 0.5M solution of tetrameric α-methylstyrene dipotassium, a conversion of 100% being obtained after 1 hour. The molecular weight is 37,000.

B. 1,500 ml of tetrahydrofuran and 60 ml of a 0.5M solution of tetrameric α-methylstyrene dipotassium in tetrahydrofuran are placed in a vessel and 310 g of ethylene oxide (distilled over butyl lithium) are added at 10°C, whereupon polymerization is effected for 4 hours by heating at 40°C. The molecular weight is 9,500.

C. The two solutions are mixed together at room temperature and stirred. After 1 hour there is obtained a soluble graft copolymer having a molecular weight of 150,000. This product crosslinks over the next few hours but is still readily meltable. Compression-molded panels made therefrom are transparent and very tough.

EXAMPLE 3

Grafting of difunctionally living polyethylene oxide on polymethyl methacrylate obtained by free-radical polymerization A. 500 ml of toluene and 320 g of methyl methacrylate are polymerized at from 80° to 90°C for 6 hours by the addition of 1.0 g of azodiisobutyronitrile. The molecular weight is 42,000.

B. 200 ml of tetrahydrofuran and 60 ml of a 0.5M solution of α-methylstyrene dipotassium in tetrahydrofuran are placed in a vessel. 310 g of ethylene oxide are added at 10°C and polymerization is effected for 4 hours at 40°C. The molecular weight is 9,500.

C. These two solutions are mixed together at room temperature and stirred for 2 hours. The properties of the graft copolymer are the same as given in Example 2.

EXAMPLE 4

Grafting of living styrene/ethylene oxide 3-block copolymer on polymethyl methacrylate A. 1,500 of tetrahydrofuran and 376 g of methyl methacrylate are placed in a vessel and polymerization is initiated at −40°C by the addition of 6 ml of a 15% butyl lithium solution in hexane. Polymerization is complete after 1 hour and the molecular weight of the product is 80,000.

B. 1,500 ml of tetrahydrofuran and 80 ml of a 0.5M α-methylstyrene dipotassium solution in tetrahydrofuran are placed together in a vessel. 136.5 g of styrene are then added at from 0° to 30°C, polymerization being complete after a few minutes. The molecular weight of the product is 8,500.

To this solution there are added 356 g of ethylene oxide and a conversion of 100% is achieved after from 4 to 5 hours at 40°C. The resulting 3-block copolymer has an ethylene oxide content of 73.5% by weight and a molecular weight of 29,000.

C. The two solutions are mixed together and stirred for several hours at room temperature. The molecular weight of the graft copolymer is found to be 210,000, the grafting yield being 100%. The degree of grafting is approximately 4, the theoretical maximum being 6. The degree of grafting can be forced to approximately 6 by heating the reaction, but this causes marked cross-linking and the products become insoluble. By degree of grafting we mean the ratio of the number of active ends of the living ethylene oxide polymer to the number of polymethyl methacrylate chains. For example, when 3 chains of ethylene oxide polymer having 2 active ends per methyl methacrylate chain are used, the maximum degree of grafting is 6. The composition of the graft copolymer is as follows:

17% w/w of styrene,
40% w/w of ethylene oxide,
43% w/w of methyl methacrylate.

Compression-molded panels made from this copolymer are transparent and very tough.

EXAMPLE 5

Grafting of living butadiene/ethylene oxide 3-block copolymer on polymethyl methacrylate A. 1,500 ml of tetrahydrofuran and 163 g of methyl methacrylate are placed in a vessel. Polymerization is initiated at −40°C by the addition of 30 ml of a 0.5M solution of α-methylstyrene dipotassium in tetrahydrofuran. The reaction is complete after 1 hour. The molecular weight is 42,000.

B. 1,500 ml of tetrahydrofuran and 163 g of butadiene are placed in a vessel. Polymerization is initiated at −20°C by the addition of 30 ml of a 0.5M solution of tetrameric α-methylstyrene dipotassium. The temperature rises to 40°C and a conversion of 100% is achieved after a few minutes. The molecular weight is 35,000 and the content of 1,2-vinyl double bonds is 65%.

To this solution there are added 17.5 g of dry ethylene oxide and the mixture is stirred for 1 hour at 50°C. The molecular weight shows no substantial increase.

C. The two solutions are mixed together and stirred at room temperature for a few hours. Extraction tests carried out on the final product with hexane show that only 4% of ungrafted polybutadiene is present. Panel compression molded from this graft copolymer are transparent and flexible.

EXAMPLE 6

Grafting of anionically polymerized polybutadiene (of high 1,4 content) on polymethyl methacrylate obtained by free-radical polymerization A. 500 ml of toluene and 320 g of methyl methacrylate are caused to react at from 80° to 90°C by the addition of 0.5 g of azodiisobutyronitrile, the reaction being carried out for 6 hours. The molecular weight is 81,000.

B. 2,000 ml of toluene and 335 g of butadiene (distilled over butyl lithium) are placed in a vessel. Polymerization is initiated at 60°C by the addition of 45 ml of a 1.5% lithium butyl solution in hexane. Polymerization is complete after 2 hours and the molecular weight is 46,000, the 1,4 content being 90%.

To this living polymer solution there are added 4.5 g of dry ethylene oxide and stirring is continued for 2 hours at 50°C. The molecular weight shows no change. Only one ethylene oxide unit reacts per living polybutadiene chain to give a lithium ethoxide end group. No polymerization of the ethylene oxide takes place under these conditions.

C. The two solutions are mixed together and stirred for 2 hours at 40°C. 45% of the ethoxylated polybutadiene reacts with methyl methacrylate units. The average degree of grafting is 2. The molecular weight is found to be about 140,000. The graft copolymer of butadiene and methyl methacrylate contains, on average, 2 polybutadiene chains and 1 polymethyl methacrylate chain per molecule.

We claim:

1. A process for the manufacture of graft copolymers based on methyl methacrylate polymers, wherein a polymer of methyl methacrylate (A) containing at least 10% by weight of polymerized units of methyl methacrylate is reacted with a high molecular weight organic compound (B) produced by reacting at least one alkylene oxide unit having an alkali metal alcoholate end group and at least one polymer block selected from the group consisting of polydiolefin, polyvinyl aromatic and diolefin-vinyl aromatic copolymer, said reaction being carried out in an anhydrous inert organic solvent by mixing solutions of components A and B at from −50° to +100 °C.

2. Graft copolymers consisting essentially of

A. a main chain consisting of polymerized units of methyl methacrylate or a copolymer of methyl methacrylate and a comonomer selected from the group consisting of acrylates or methacrylates of alcohols having from 1 to 8 carbon atoms in the alkyl radical, acrylonitrile, methacrylonitrile, and butadiene, said copolymer containing at least 25% by weight of methyl methacrylate units, and B. at least one side chain per main chain, which side chain consists of more than 25% of polymerized units of butadiene and have 1,4-configuration to the extent of from 75 to 95%, each of said polybutadiene side chains being linked via an alkylene oxide unit with the main chains consisting of methyl methacrylate.

3. Graft copolymers as set forth in claim 2, wherein some of the side chains act as bridging chains between two main chains.

4. Graft copolymers as set forth in claim 2 wherein from 2 to 20 side chains are present per main chain.

* * * * *